(12) United States Patent
Jones

(10) Patent No.: US 7,610,408 B2
(45) Date of Patent: Oct. 27, 2009

(54) AUTOMATIC LINK COMMISSIONING

(75) Inventor: Jeffrey P Jones, Los Gatos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 547 days.

(21) Appl. No.: 11/479,196

(22) Filed: Jun. 29, 2006

(65) Prior Publication Data

US 2008/0005618 A1    Jan. 3, 2008

(51) Int. Cl.
*G06F 15/16* (2006.01)
*H04B 1/38* (2006.01)

(52) U.S. Cl. .................................. 709/250; 455/559

(58) Field of Classification Search ............... 709/250; 455/559; 370/464
See application file for complete search history.

(56) References Cited

U.S. PATENT DOCUMENTS

| | | | | |
|---|---|---|---|---|
| 6,941,405 B2* | 9/2005 | Morrow | ................ | 710/305 |
| 7,133,416 B1* | 11/2006 | Chamdani et al. | ........... | 370/466 |
| 7,317,689 B1* | 1/2008 | Liu | ............................ | 370/246 |
| 7,337,259 B2* | 2/2008 | Lee | ............................ | 710/305 |
| 7,412,553 B2* | 8/2008 | Morrow | ..................... | 710/305 |
| 2001/0053624 A1* | 12/2001 | Medina et al. | .............. | 439/404 |
| 2004/0063464 A1* | 4/2004 | Akram et al. | ............... | 455/559 |
| 2004/0225770 A1* | 11/2004 | Lee et al. | .................... | 710/200 |
| 2005/0021874 A1* | 1/2005 | Georgiou et al. | ........... | 709/250 |

* cited by examiner

*Primary Examiner*—Krisna Lim

(57) ABSTRACT

A smart interface converter senses initial activation in a network environment, performs preselected tests, and signals to a predefined destination. The tests performed may include internal device status, bit error rates, power levels, and the like. Signaling to a predefined destination may take place automatically on completion of the tests, or may be conditioned on the receipt of a control message addressed to the smart interface converter. The signaling by the smart interface converter may trigger events such as the activation of one or more services.

11 Claims, 3 Drawing Sheets

AUTOMATIC LINK COMMISSIONING

TECHNICAL FIELD

Embodiments in accordance with the invention are related to computer network interfaces, and more particularly, using smart interface modules to automatically commission network links and services.

BACKGROUND

Interface converters used in digital networks are small pluggable modules which convert signals from one form to another. As an example, an interface converter known as a GBIC (Giga Bit Interface Converter) provides bidirectional conversion of signals to and from electrical and electrical or optical form, connecting twisted pair copper cables or fiber optic cables to devices such as hubs, switches, and routers. Such converters are offered in standardized packages and interfaces such as GBIC, XENPAK, SFP, XFP, and XPAK. Many of these interfaces provide digital diagnostic information on a special two wire slow-speed electrical port. The industry-standard SFF-8472, Diagnostic Monitoring Interface for Optical Xcvrs, provides for a diagnostics standard including parameters such as optical transmit and receive power, voltage and temperature measurement, vendor identification, optical wavelength, serial number, and other factory parameters.

While these modules provide information on internal operation, this information is either only available locally, or through added interfaces in the switch or router. Improved diagnostic or information capabilities in these pluggable modules cannot be accessed unless and until they are supported by the myriad of devices which may host them.

SUMMARY OF THE INVENTION

A smart interface converter senses initial activation in a network environment, performs preselected tests, and signals to a predefined destination. The tests performed may include internal device status, bit error rates, power levels, and the like. Signaling to a predefined destination may take place automatically on completion of the tests, or may be conditioned on the receipt of a control message addressed to the smart interface converter. The signaling by the smart interface converter may trigger events such as the activation of one or more services.

DETAILED DESCRIPTION OF THE EMBODIMENTS

Interface converters are building blocks used in many networking devices such as high speed switches, hubs, and routers, and are used to convert high speed signals from a first medium to a second medium. As an example, one popular type of interface converter known as a GBIC converts signals from optical to electrical form; optical signals carried on fiber optic cables being used to communicate over the network, and electrical signals being used within the device housing the GBIC. Other GBIC forms convert signals from twisted-pair copper conductors used in high-speed networks to electrical signals suitable for the device housing the GBIC. While the present invention is described in terms of the GBIC form factor, it is equally applicable to other form factors including but not limited to XPAK, XENPAK, XFP, and SFP. In addition to the high-speed interfaces, interface converters may contain a slow-speed data port which may be used for configuration, testing, and sensing device status according to standards such as SFF-8742.

Smart interface converters include additional logic within the interface converter package. This additional logic may include the ability to query the status of the interface converter, perform internal tests, and/or perform data capture and analysis.

As an example, the smart interface converter may be able to track and report bit error rates, transmit and receive power levels, power supply voltages, device temperatures such as the operating temperature of a laser diode.

The smart interface converter adds the ability to inject data packets into the high speed data stream. In conjunction with such communications capability, the smart interface converter contains a unique identifier, which may be a serial number or a MAC address.

Figure 1:
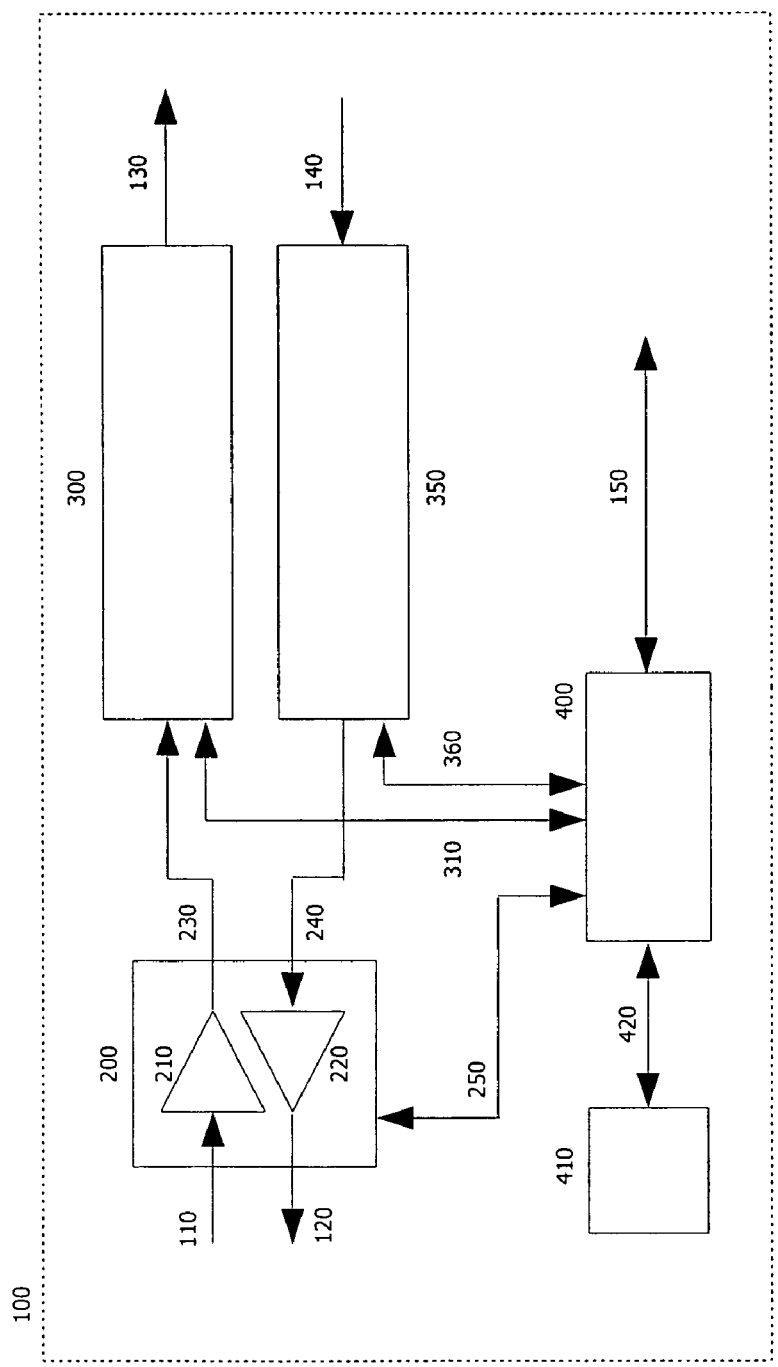
FIG. 1 shows a block diagram of a smart interface converter.

FIG. 1 shows a block diagram of a smart interface converter 100 according to the present invention. In the case of an optical fiber device, optical fiber input 110 is converted 210 to high-speed electrical output 130 in serial form; similarly, high-speed serial electrical input 140 is converted 220 to optical fiber output 120. For a device using high-speed copper, electrical input 110, typically one or more twisted pairs, is converted 210 to a high-speed electrical output 130 in serial form; similarly, high-speed serial electrical input 140 is converted 220 to electrical output 120. Slow-speed serial interface 150 is provided for local diagnostics, converter configuration, and the like. For clarity, features common to the art such as power supplies are not shown. While the examples shown are in terms of an interface converter with optical connections, the invention is equally suitable for interface converters using copper cables.

In optical modules, electro/optical converter 200 typically comprises a high-speed photodiode and amplifier for input converter 210, and a laser diode with accompanying control circuitry for output converter 220. Interface 250 provides access to converter information such as device temperatures, input and output power levels, and the like.

Converter 200 feeds smart channels 300 and 350 which provide the ability to inject packets into the high-speed data stream. These smart channels are controlled by controller 400, which communicates 250 with electro/optical converter 200, and also communicates 420 with parameter memory 410, which in one embodiment is an electrically alterable memory such as Flash or EEPROM.

Figure 2:
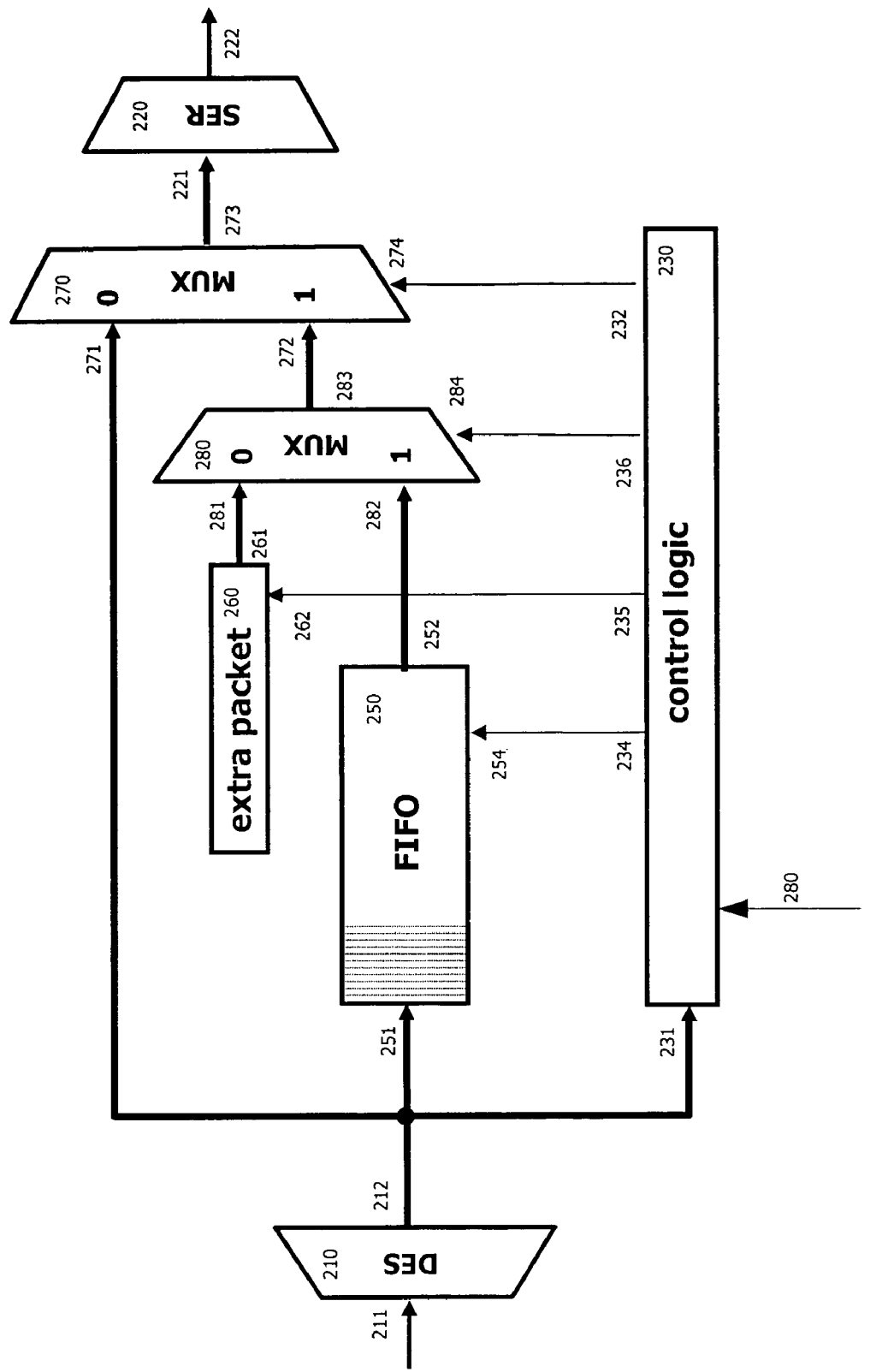
FIG. 2 shows a block diagram of a smart channel.

Further details of smart channels 300 and 350 are shown in FIG. 2. The operation of smart channels 300 and 350 is described in detail in U.S. Pat. No. 7,336,673, titled "A Method of Creating a Low-Bandwidth Channel within a Packet Stream," the entire disclosure of which is hereby incorporated by reference and is merely summarized here.

High speed serial input 211 is deserialized 210 into parallel form 212. This parallel data is fed to multiplexer 270, first-in-first-out (FIFO) buffer memory 250, and control logic 230. Multiplexer 270 feeds parallel data 273 to input 221 of serializer 220, which converts parallel data 221 to high-speed serial output data 222. Multiplexers 270 and 280 operate under control 274, 284 of control logic 230, selecting as the datastream to serializer 220 the output 212 of deserializer 210, the output 261 of extra packet memory 260, or the output 252 of FIFO buffer 250. Switching multiplexers 270 and 280 to select extra packet memory 260 allows the contents of extra packet memory 260 to be sent to serializer 220 and injected into the high speed datastream output 222. Extra packet memory 260 is controlled and loaded 262 235 by control logic 230. FIFO 250 is used to buffer incoming packets. Input 280 to control logic 230 is used to preload extra packet memory 260, initialize control logic 230 specifying capture and trigger events and the like.

While the block diagrams of FIGS. 1 and 2 show separate control logic blocks 230 for smart channels 300 and 350, they may be incorporated into the same physical logic element, such as a gate array, and may be implemented in the same logic element as controller 400.

Slow-speed interface 150 may be used, for example, to configure parameter memory 410 during manufacturing, and prior to device deployment. According to the present invention, smart interface converter contains a serial number, which may be stored in memory 410. Controller 400 and memory 410 are also configured for a series of tests to be performed on initial network connection. This may be done, for example, by placing a set of flags in memory 410 which enable tests, or by placing code or pointers to code in memory 410 denoting the tests to be run. Also preset in memory 410 is the destination address for reporting test information. This address, by example, may be an IPV4 or IPV6 address.

Figure 3:
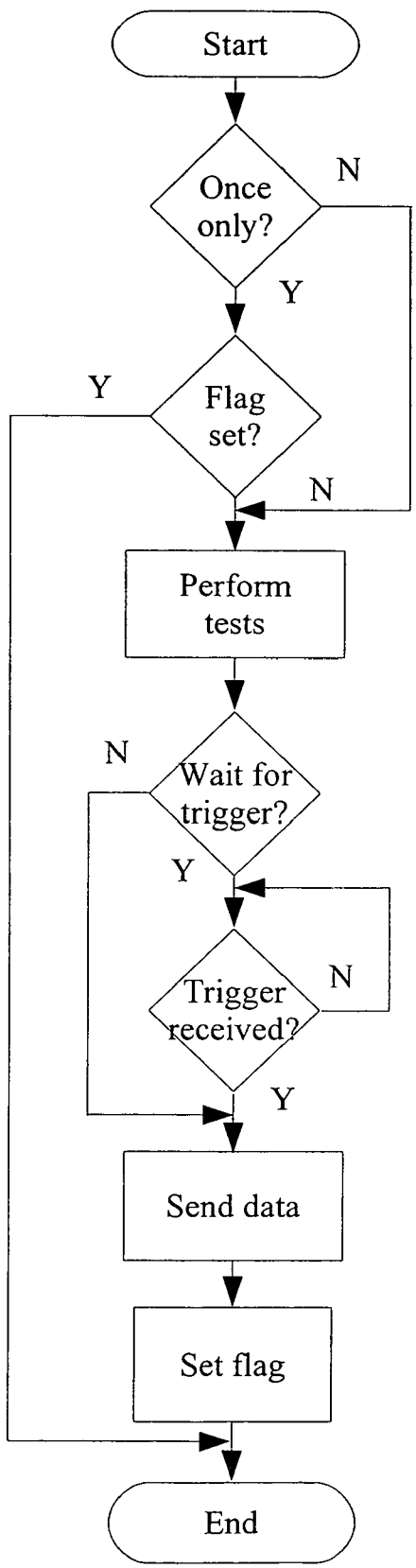
FIG. 3 shows a flow diagram of device startup.

According to the present invention, and following the flow diagram of FIG. 3, the smart interface converter detects initial network connection. This may be done through sensing activity on the high speed communications ports, such as receive power level above a preset threshold in an optical module, the smart channels detecting symbols, detecting electrical connection to a high speed communications port, detecting the presence or absence of electrical jumpers, detecting the state of switches, or other means known to the art.

Smart interface converter 100 may be configured to perform startup tests and reporting only once, or on every occasion it is powered up connected to a network. If configured to perform startup tests and reporting only once, on detecting network presence, smart interface converter 100 checks to see if this startup sequence has been previously completed. In the embodiment shown, this may be done by checking a flag stored in memory 410. If the flag indicates the startup sequence has been performed already, then the remainder of this sequence is skipped.

The startup sequence continues with controller 400 performing preselected tests. These tests include but are not limited to link quality tests such as transmit and receive power levels, bit error rate testing, operating environment tests such as temperatures and voltages, and the like.

Once tests have been performed, smart interface converter 100 either signals to the predetermined destination, or waits for receipt of a control message to signal to the predetermined destination. Data is signaled to the destination by placing the desired information into extra packet buffer 260 of the proper smart channel, either or both of 300 or 350 of FIG. 1 depending on the destination. As packets are built in extra packet buffer 260 they can be injected into the high-speed data stream 130 or 120 of FIG. 1.

If smart interface converter 100 has been configured to wait for receipt of a control message before signaling to the destination, controller 400 loads 310, 360 either or both smart channels 300 and 350 with the trigger information. Since smart channels 300 and 350 are able to monitor all traffic passing through smart interface converter 100, the trigger information may be contained for example in a specially crafted packet or packet header.

The information sent to the destination includes identification information from smart interface converter 100, and may include results of the preselected tests.

Once the information is sent, a flag is set in memory 410 to indicate this startup processing has been completed.

At the destination address, receipt of a startup message from smart interface converter 100 may be logged and used to initiate other services. Communications from smart interface converter 100 may be used, for example to validate installation information such as the network circuit or path on which it is installed, activation time, and the like. Value-added services may be initiated. These services could include but are not limited to monitoring of the communications link and smart interface converter status. As an example, smart interface converter 100 could be monitored remotely, periodically checking the status of the communications link and converter status to flag link or interface degradation.

While the embodiments of the present invention have been illustrated in detail, it should be apparent that modifications and adaptations to these embodiments may occur to one skilled in the art without departing from the scope of the present invention as set forth in the following claims.

The invention claimed is:

1. A method of operating a smart interface converter having at least a first high speed interface and a second high speed interface comprising:
   from within the smart interface converter,
       sensing initial powerup of the smart interface converter;
       performing preselected initial tests within the smart interface converter;
       building at least one data packet in response to results of the preselected initial tests; and
       injecting the at least one data packet into a data stream between the first high speed interface and the second high speed interface, the at least one injected data packet signaling completion of the preselected initial tests to a predefined destination on one of the first or second high speed interfaces.

2. The method of claim 1 where the initial tests are selected from one or more of:
   bit error rate, transmit and/or receive power levels for the first high speed interface, operating temperature, device identification.

3. The method of claim 1 wherein the data packet injection to signal completion of the preselected initial tests to a predefined destination occurs automatically after completion of the preselected initial tests.

4. The method of claim 1 wherein the data packet injection to signal completion of the preselected initial tests to a predefined destination occurs upon receipt of a control message addressed to the smart interface converter.

5. The method of claim 1 further including the step of activating a service upon receipt of the signaling to the predefined destination.

6. The method of claim 1 where the step of sensing initial powerup further includes the step of sensing connection of the first high-speed interface to a high-speed network.

7. The method of claim 6 where the first high-speed interface is an electrical interface.

8. The method of claim 7 where the step of sensing connection to a high-speed network comprises sensing electrical connectivity to the electrical interface.

9. The method of claim 6 where the first high-speed interface is an optical interface.

10. The method of claim 9 where the step of sensing connection to a high-speed network comprises sensing optical power at the optical interface.

11. The method of claim 6 where the step of sensing connection to a high-speed network comprises detecting symbols arriving at the first high-speed interface.

\* \* \* \* \*